United States Patent [19]

Bohm et al.

[11] 4,122,137
[45] Oct. 24, 1978

[54] RADIATION CURE OF RUBBER SHEETS

[75] Inventors: Georg G. A. Böhm, Akron; William W. Barbin, Massillon, both of Ohio

[73] Assignee: The Firestone Tire & Rubber Company, Akron, Ohio

[21] Appl. No.: 641,150

[22] Filed: Dec. 15, 1975

[51] Int. Cl.² ............................................. B29H 17/16
[52] U.S. Cl. .................................. 264/22; 156/123 R; 204/159.2; 204/160.1; 264/25; 264/166; 264/284; 264/236; 264/326; 264/347
[58] Field of Search ................... 264/22, 25, 280, 284, 264/119, 210 R, 166, 236, 347, 177 R, 326; 204/160.1, 159.2; 156/123

[56] References Cited

U.S. PATENT DOCUMENTS

| | | | |
|---|---|---|---|
| 1,906,402 | 5/1933 | Newton | 204/160.1 |
| 2,109,190 | 2/1938 | Coffey | 264/284 |
| 2,446,771 | 8/1948 | Knowland | 264/284 |
| 2,686,554 | 8/1954 | Hinman | 264/326 |
| 2,863,812 | 12/1958 | Graham | 204/159.18 |
| 2,907,365 | 10/1959 | MacDonald | 264/326 |
| 2,933,441 | 4/1960 | Mallon | 264/22 |
| 3,658,620 | 4/1972 | Hall | 264/22 |
| 3,725,230 | 4/1973 | Bahder et al. | 204/159.2 |
| 3,838,142 | 9/1974 | Hochstein | 264/94 |
| 3,933,553 | 1/1976 | Seiberling | 156/123 |
| 3,959,053 | 5/1976 | Fisk et al. | 264/22 |

Primary Examiner—Jeffery R. Thurlow
Attorney, Agent, or Firm—Cooper, Dunham, Clark, Griffin & Moran

[57] ABSTRACT

Process and apparatus for the production of rubber sheets such as tire treads having a surface design in which the rubber is at least partially cured in a mold.

11 Claims, 8 Drawing Figures

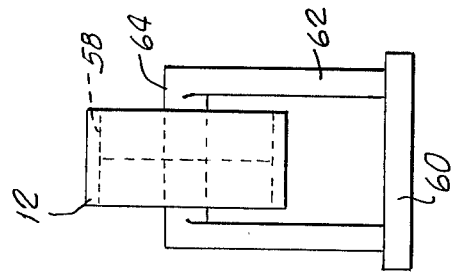
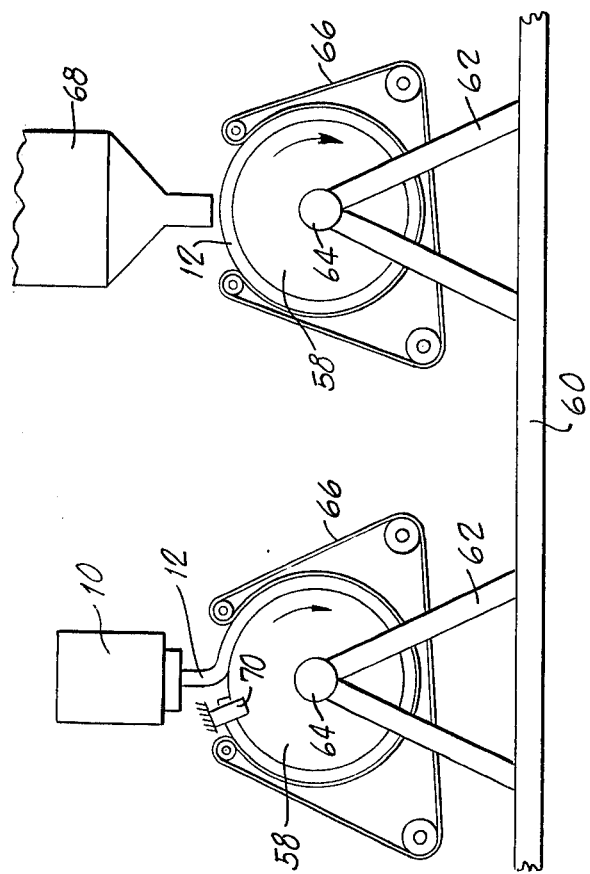

RADIATION CURE OF RUBBER SHEETS

This invention is concerned with cured rubber sheets having a surface design, and processes and apparatus for their production. The surface design may be, for example, an embossed, ornamental design only a fraction of an inch in depth or a tire tread design which may be up to one inch deep, or even more.

Recently, considerable effort has been expended to eliminate conventional heat curing in which rubber is completely cured employing, for example, peroxides, sulfur or sulfur derivatives as curing agents. Amongst the reasons for these efforts has been the odor evolved in the process, the time required for complete curing, and the volatility of the oils used in compounding at temperatures conventionally used for heat curing.

One method of curing which has attracted considerable attention is radiation curing of natural and synthetic rubbers which may be compounded with various additives. In this method, the rubbers are at least partially cured by exposure to high energy ionizing radiation, for example an electron beam. This invention is concerned with novel methods and apparatus employing such radiation to effect a partial or a complete cure of natural rubber, synthetic rubber, and rubber compounds (hereinafter referred to simply as rubber, for convenience).

The invention is applicable to the production of a wide variety of rubber products which are produced in sheets having a surface design, although not necessarily utilized as sheets in their final form. These include, for example, acoustical sheeting, floor tiles, decorative sheeting, floor mats, automotive mats and the like.

The invention is particularly applicable to the continuous production of tire treads, such as are employed in retreading worn tires. In accordance with the invention, rubber sheets having a tire tread surface design, and useful for retreading tires, may be produced in the form of continuous tire tread strips or in the form of generally cylindrical rings which may be fitted to a new or used tire carcass. Most unexpectedly, tire treads formed by a process which includes radiation treatment in accordance with this invention are more abrasion resistant than conventional heat cured products.

The invention will be more completely understood from a consideration of the following description taken in conjunction with the accompanying drawings in which:

FIG. 4 is a diagrammatic representation of a third embodiment of the invention;

FIG. 4A is an end view of the molding device of FIG. 4; and

Figure 1:
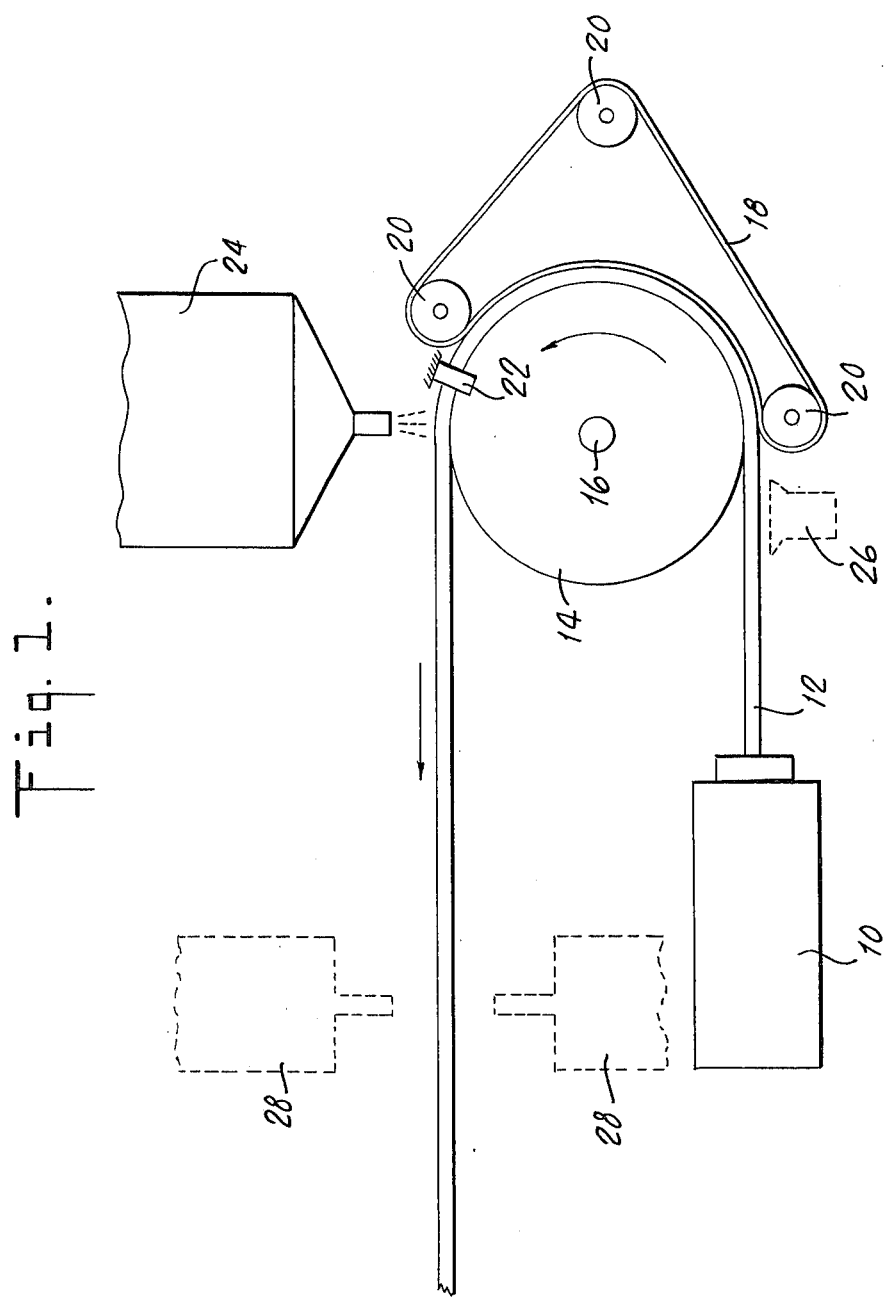
FIG. 1 is a diagrammatic representation of one embodiment of the invention.

In FIG. 1, 10 is a conventional extrusion or coextrusion unit which extrudes a sheet or strip of hot viscous rubber which may be in the form of one or more layers. The unit may be of the single, twin or multiple screw variety, or it may be a ram type extruder. Tread strip 12, which may be of sufficient bodily integrity so that no support is required, passes around cylindrical mold 14 rotating about axis 16. A design, for example a recessed tire tread design, is formed on the peripheral surface of the mold, and hot rubber strip 12 is forced into the grooves and recesses of the mold by pressure belt 18 rotating on guide rolls 20.

The tread 12, after emerging from the influence of the pressure belt 18, passes by a knife 22 which straddles the mold and removes any excess rubber which overflows the mold. The excess may be returned to the extruder 10. The tread 12 then passes through a radiation beam generated by radiation generator 24. The rubber is rapidly cured and stripped from mold 14, as shown.

FIG. 1 also illustrates an alternate curing procedure using both heat and radiation cure. In this embodiment, the tread is formed from rubber stock which has been compounded with heat curing agents. The tread passes heater 26 and is partially heat cured while pressed in the mold 14 under pressure belt 18.

Radiation source 24 need not be employed in this structure. Alternatively, since curing completion may be accomplished outside of the mold, cure may preferably be effected by beams originating from radiation units 28 on each side of the partially cured tread 12.

Instead of using a heater 26, the mold 14 can be heated to a cure temperature. Even if no heat cure is utilized, it is often advantageous to heat the mold in order to facilitate the flow of the rubber, to obtain better definition of the design, and to increase the radiation efficiency.

Figure 2A:
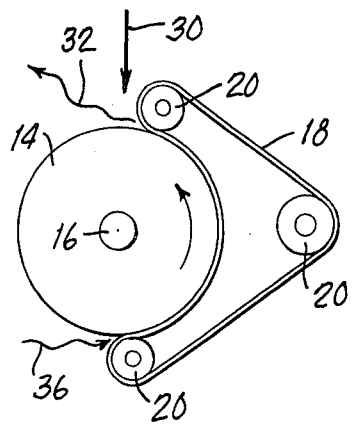
FIGS. 2A, 2B and 2C illustrate alternate embodiments of the belt configuration of FIG. 1.
Figure 2B:
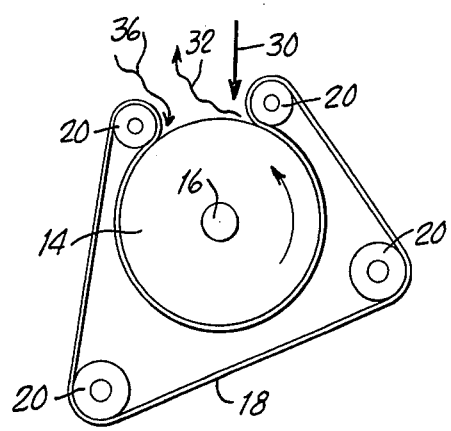
Figure 2C:
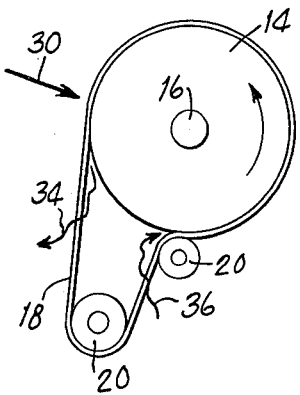

FIG. 2 shows suitable belt configurations to maintain pressure on the rubber in the mold for varying portions of the mold circumference. In FIGS. 2A, 2B and 2C, the reference numerals which are identical with the numerals of FIG. 1 have the same meaning as in FIG. 1. Straight arrows 30 indicate a radiation beam. Curved arrows 32 in FIGS. 2A and 2B represent the stripping off of the cured rubber. In FIG. 2C, the cured tread is removed as indicated by curved arrow 34. Curved arrow 36 represents the source of tread 12 which, as evident, is slightly out of the plane of the lateral edge of mold 14.

Normally the design represented by FIG. 2A is satisfactory, especially for low viscosity materials. However, highly viscous materials frequently possess a considerable degree of memory. Therefore, the length of time that the rubber is kept in the mold under pressure must be increased. Otherwise the viscous rubber will lose the shape of the mold as soon as the pressure is released.

It will be noted that in FIG. 2C the electron beam passes through the belt 18. If the beam is required to penetrate the belt to reach the rubber, the belt must be constructed of a material which will permit passage of the electrons with minimum loss of energy. Titanium belts are available which are of sufficient strength to be used continuously, and do not require excessive energy for traversal by the electrons.

Any of the conventional sources of ionizing radiation are useful for the practice of this invention. The preferred sources are electron accelerators which produce high energy, high intensity electron beams. The energy requirements of the accelerator will depend upon the thickness of the rubber being cured or vulcanized. Electron accelerators with energy ratings from 10 Kev to 10 Mev are currently available, and these may be used in the practice of the invention.

The curing may be carried out by passing the rubber strip through a beam of electrons under conditions which give a dose of from 1 to 50 Mrads, preferably 5 to 10 Mrads.

The selected energy source, radiation dose and dose rate will depend upon several factors readily evaluated by those skilled in the art. They will be selected so as to best balance cost of production with desired production rate based upon the rubber to be cured. Many rubber compounds or mixtures are now available which have been compounded with appropriate curing agents, promoters and other ingredients to facilitate the use of radiation production techniques.

The thickness and density of the rubber to be cured is important, especially if complete cure is to be effected in the mold. An important consideration is to select the electron energy and the mold constituents so as to minimize electron back scattering. If the energy is too high, and the mold material is poorly selected, a large number of the electrons in the radiation beam completely penetrate the rubber to be cured and reflect from the surface of the mold back into the rubber (back scattering) and cause additional curing. This problem is especially acute with tire tread molds where some sections of the rubber sheet will be quite thick, and others relatively thin. The thin sections may be overcured, especially in the regions adjacent the mold surface.

For best results therefore, the mold should be constructed of material having minimum reflection of electrons. It is also necessary that the mold be sufficiently strong to withstand the rigors of continuous operation. With these criteria in mind, the mold is normally constructed of aluminum or its alloys, although other materials such as ceramics or special polymers may be used.

Typically, when utilizing such molds in accordance with this invention for the cure of useful natural or synthetic rubbers from 1 mil to 1.5 inches thick, the electron energy source will be one which is rated at 10 Kev to 10 Mev.

An important aspect of this invention is that the rubber be removed from the mold without distortion of the design imparted to the rubber surface by the face of the mold. This can be effected by completely curing the rubber by radiation energy while it is in the mold.

An optional technique within the scope of the invention is to compound the rubber with conventional heat curing agents, and to effect a partial heat cure, sufficient to maintain design integrity during stripping from the mold, and to thereafter complete the cure with radiation energy outside of the mold. There are several production advantages of this option. One is that the construction material for the mold need not be selected for its properties with respect to radiation reflection. Another is that the reduced total energy requirements achieved by exposing both surfaces of the rubber sheet to radiation make possible the use of less expensive radiation equipment.

Figure 3:
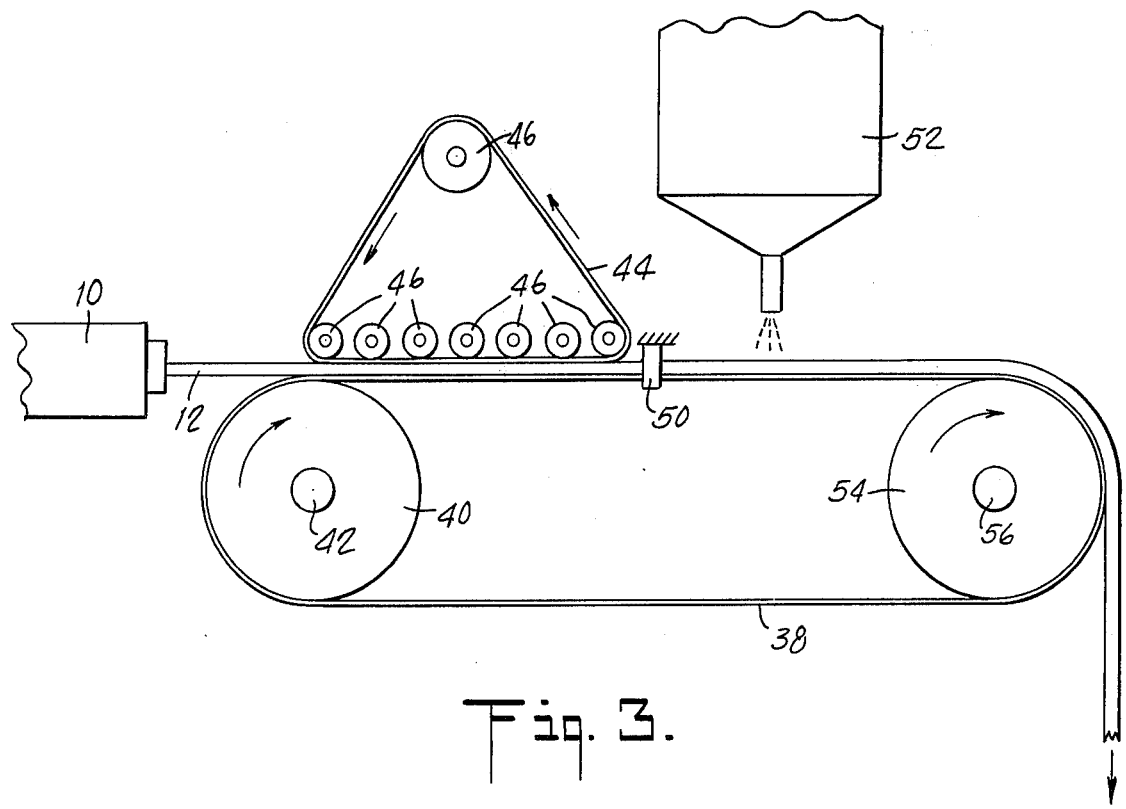
FIG. 3 is a diagrammatic representation of another embodiment of the invention.

FIG. 3 illustrates another embodiment of the invention in which rubber sheet 12, from extruder 10 contacts a continuous metallic sheet 38 having a design on its face as it passes over roll 40 rotating on axis 42. Press belt 44 passing around guide rolls 46 forces the hot rubber into the design. The rubber in the design passes knife 50, radiation source 52, guide roll 54 rotating on axis 56, and is then stripped from the mold face.

If a partial heat cure is desired, a heat source, for example a microwave generator, may be interposed between the extruder 10 and the pressure belt 44.

The pressure on the rubber may be more uniformly distributed by placing a rigid metallic sheet between the belt 44 and the lower course of guide rolls 46.

The embodiment of FIG. 3 is especially useful for the preparation of embossed designs where the recess is relatively shallow. Of course, in this as in other embodiments of the invention, the embossing may be deep enough to form segmenting lines. The cured sheet may thereafter be broken along these lines to form separate pieces. This procedure is especially useful for the formation of floor tiles.

The embodiment of FIG. 3 is also useful, with slight modification, for the preparation of products with relatively deep designs. This can be accomplished by replacing the rotating belt mold with a rotating segmented mold in which the various sections of the mold are hinged to permit passage around the guide rolls 40 and 54.

Floor tiles with relatively soft areas, for example, central segments, which are softer than other sections, are useful to prevent persons walking on the tiles from slipping and falling. Such tiles, and other similar products employing differential or pattern design are readily prepared by the process of this invention. To do so, the radiation beam is directed towards the rubber sheet through a masking belt, plate, or other masking means.

In the simplest case, the plate will be formed with a plurality of openings of any selected shape. With this design, the body of the plate may be totally impervious to the electron beam. The plate is so arranged that the rubber traverses only a portion of the beam passing through the plate. The rubber is fully exposed to the remaining portion of the beam after passing the plate. In this way, selected parallel sections of the rubber are exposed to more radiation than other sections. These former sections become more fully cured, and therefore harder than the sections receiving lesser amounts of radiation.

For more complicated designs, the radiation beam is directed to the rubber sheet through a belt, open spaces in which are formed into the desired pattern. The optimum procedure is to utilize a belt traveling at the same linear speed as the rubber sheet. Alternatively, the belt may be fixed and the radiation beam pulsed. This latter procedure, however, is not preferred.

FIG. 4 illustrates an embodiment of the invention suitable for producing seamless treads. In the figure, a plurality of separable molds, such as mold 58, are mounted on a track or rail system 60, only a portion of which are shown by frames 62. The cylindrical molds are rotatable about arms 64. Rubber strip 12 from extruder 10 at the extruding station falls by gravity onto cylindrical mold 58. A compensator may be used between the extruder and the cylinder to assist in controlling the rate at which the strip is deposited. The rubber is pressed into the mold recesses by press belt 66. When the mold is filled, sensing means (not shown) deactivate the extruder, and move the cylinder to the next or radiation station. The cylinder rotates at least once and preferably several times about its axis so that the seam is obliterated. Sensing means (not shown) then activate the radiation source 68 to effect curing. At the end of the complete curing rotation cycle, the sensing means deactivate the radiation source, and the mold moves to the pickoff station shown in FIG. 4A, where it is separated by conventional means and the seamless tread removed.

The belt and the mold are driven by conventional means which, for convenience, are not shown.

Knife 70 which is shown at the extrusion station is for removal of excess rubber. It is separately mounted from the mold, and movable so as not to prevent the movement of the mounted cylindrical mold to the radiation station.

Figure 5:
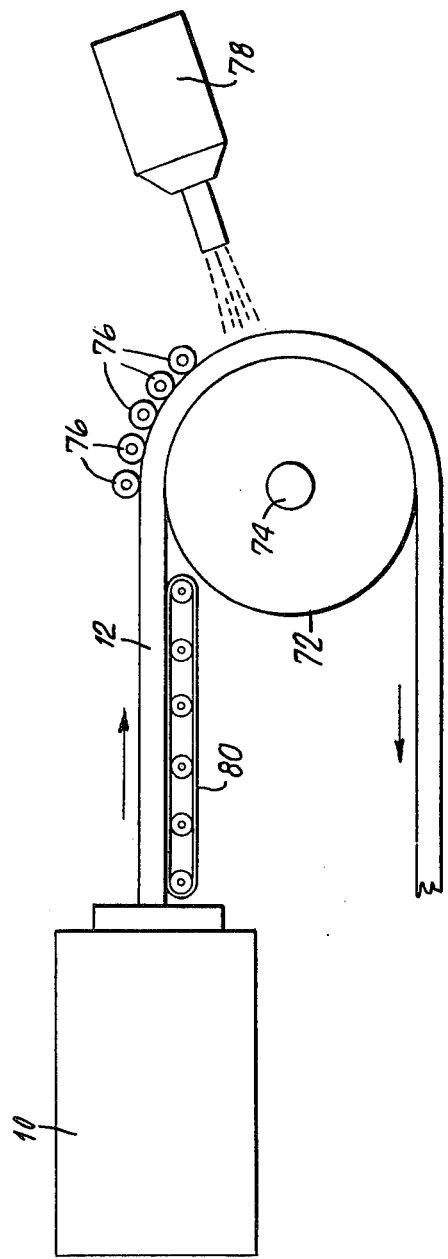
FIG. 5 is a diagrammatic representation of still another embodiment of the invention.

FIG. 5 shows still another apparatus within the scope of the invention which uses press rolls instead of press belts. It is especially useful for the preparation of thin sheets from materials of relatively low viscosity.

In FIG. 5, 10 is an extruder which extrudes a sheet or strip 12 of hot rubber as one or a plurality of layers which are extruded simultaneously into a sheet. Strip 12 passes around cylindrical mold 72 rotating about axis 74. A design is formed on the peripheral surface of the mold, and hot rubber from strip 12 is forced into the grooves and recesses of the mold by press rolls 76. A high energy ionizing radiation source 78 is used to direct a beam of high energy ionizing radiation, for example, an electron beam into the rubber while it is in the mold in contact with the mold surface to effect a cure. The cured sheet is removed as shown.

If the strip is not self-supporting, it may be supported by roll and belt assembly 80.

What has been described is an apparatus and process for the continuous production of cured rubber sheets having a surface design. The apparatus and process are particularly useful for the production of embossed rubber sheets and tire treads. The apparatus generally comprises an extruder for forming the rubber into soft sheets or strips which are pressed into a mold having the selected design. The mold is generally arcuate. While the rubber is in the mold, it is at least partially cured by heat or high energy ionizing radiation. The rubber is then removed from the mold. The curing may be completed, if necessary, by further radiation treatment outside the mold.

As stated above, the radiation cured products of this invention have a higher abrasion resistance than products which are completely cured by heat. This was established by the road wear tests on specially constructed tires.

The experimental tires were built with alternating sections of radiation cured and heat cured treads. There were three experimental tread sections per tire for each system. Each tire was a 7.35-14 tire with one rayon body ply and four rayon tread plies. The tires were mounted on a test car, and inflated to 24 psi. The test load on the front tires was 1,090 lbs./psi, and on the rear tires 965 psi. All the tire treads were constructed from Stereon-700, a butadiene-styrene polymer. The sulfur cure or heat cure rubber was compounded with, for each 100 parts of Stereon, 50 parts of intermediate super abrasion furnace black (ISAF), 3 parts zinc oxide, 2 parts stearic acid, 1.7 parts sulfur, 1 part Santoflex-13 [N(1,3-dimethylbutyl)-N'-phenyl-p-phenylenediamine] and 0.8 parts Cyclex B [t-butyl benzathiazolsulfenamide]. The radiation cured tire contained, for each 100 parts Stereon, 50 parts ISAF, 3 parts zinc oxide, and 2 parts stearic acid.

The tires on the test car were subjected to highway driving at up to 60 MPH with a predetermined number of stops and starts. The test highway was constructed with a smooth, gravel-free surface. The tires were rated for wear or abrasion resistance based upon the amount of wear per mile. At the first inspection following 4,457 miles of test driving, the wear rating of the radiation cured treads was 72, whereas the sulfur cured treads were rated at only 57. At the end of 7,963 miles, the comparable ratings were 76 and 55.

The following non-limiting examples were given by way of illustration only.

Stereon-700 utilized in the examples is a butadiene-styrene copolymer manufactured by The Firestone Tire & Rubber Company. It contains from 18 to 21% bound styrene. Its solution viscosity (5% in styrene), cps is 50-70. The Mooney viscosity (ML-4 at 212° F.) is 50-60. Its molecular weight distribution is such that its weight average molecular weight ($M_w$) is 280,000, its number average molecular weight ($M_n$) is 112,000, and the ratio of $M_w$ to $M_n$ is 2.5.

EXAMPLE 1

A Stereon-700 polymer is mixed with 70 parts per hundred (phr) HAF Black, 40 phr naphthene oil (Sunthene oil 4240) and 2 phr p-dichlorobenzene as a radiation promoter. The compounded stock is extruded at 212° F. through the 10 inch screw extruder of FIG. 1. The strip cross section is $\frac{1}{2}$ inch by 7 inches and the linear speed is 23 feet per minute. The extruder die is only 1 foot from the press roll. The proximity of the extruder die takes advantage of the hot, broken-down nature of extruder stocks. The pressure belt is set to a gap so that flow into the wheel design will result. The tread design is on the perimeter of the wheel. The wheel is 20 inches in diameter, rotating at a speed of about 4.4 rpm. The wheel temperature is 250° F. The belt prevents the rubber compound from recovering, and allows the stock a longer period of time to assume the tread design. The belt covers the wheel perimeter from the 6 o'clock to 1 o'clock position. Just before irradiating, knives cut the mold overflow which is returned to the extruder feed line. After passing from under the belt, the tread is irradiated with 8 Mrad at the 12 o'clock position. The radiation source is a 4.5 Mev 6 ma Linac. The cure is most instantaneous, and the cured tread is taken up immediately after irradiation for application to the prepared carcass.

EXAMPLE 2

The same rubber compound used in Example 1 is extruded in the extruder of FIG. 1 at 212° F. with a cross-section of 0.25 inch by 7 inches. The linear speed is 46 feet per minute. The design on the wheel is not as intricate since only embossed sheeting is the product. The extruder die is 1 foot from the press roll for the same reasons as cited in Example 1. The press rolls are set to force the compound to assume the embossed design on the wheel. The wheel is 20 inches in diameter, rotating at 8.8 rpm and heated to 250° F. The belt prevents recovery and helps design definition on the sheet. The belt covers the wheel circumference from the 6 o'clock to the 1 o'clock position. Knives cut mold overflow, and it is returned to the extruder feed line. After passing from under the belt, the sheet receives an 8 Mrad dose at the 12 o'clock position from a 2.5 Mev 12 ma Dynamatron. Immediately after irradiation, the cured sheet is taken up for final use.

EXAMPLE 3

A total of 0.5 phr of sulfur and 1.8 phr of tetramethyl thiuram disulfide as an accelerator are added to each of the rubber compounds of Examples 1 and 2. The tread cross-section, extruder characteristics, press roll conditions, wheel diameter, and wheel rpm are the same as in Example 1. The wheel temperature is increased to 300° F. to cause the partial heat cure of the compound. The belt extends almost the entire circumference of the wheel from the 6 o'clock to the 8 o'clock position. This allows pressure to remain on the tread during the partial heat cure. After removal from the wheel, the tread is trimmed of mold overflow and irradiated from both sides with 8 Mrad from a 2.5 Mev 12 ma Dynamatron causing complete cure. The tread is then taken up and ready for use immediately after irradiation.

EXAMPLE 4

A Stereon-700 polymer is mixed with 70 phr HAF Black, 10 phr Sunthene oil, 2 phr p-dichlorobenzene and treated as in Example 1. Because this stock is more viscous than the previous stocks, the residence time under the pressure belt is extended by the use of the belt shown in FIG. 2C. The stock is irradiated while still under the belt so the stock has no time to recover before curing. The belt is made of titanium with a thickness of 0.0025 inch. The belt absorbs only a small percent of the electrons. After irradiation, the stock is removed from the wheel.

What is claimed is:

1. A continuous process for the production of cured rubber strips with a surface design comprising the steps of:
   (a) continuously extruding and advancing a soft viscous rubber strip;
   (b) pressing said advancing rubber strip into the recesses of a moving mold, said recesses being on the surface of the mold and formed into the selected design;
   (c) partially heat curing the rubber throughout the strip while maintaining it under pressure in the mold;
   (d) stripping the partially cured rubber strip with the selected design from the mold without distorting the design formed on the surface of the rubber; and,
   (e) completing the curing of the partially-cured rubber throughout the strip after removing it from the mold by exposure to high-energy ionizing radiation.

2. A process as in claim 1 wherein the rubber strip is extruded in a plurality of layers.

3. A process as in claim 1 wherein the beam of high energy ionizing radiation is directed towards the rubber strip through masking means.

4. A process as in claim 3 wherein the masking means comprise a belt moving at the same speed as the mold.

5. A process as in claim 1 wherein step (b) the rubber strip is pressed into recesses on the peripheral surface of a rotating cylinder, said recesses being in the design of a tire tread.

6. A process as in claim 1 wherein the rubber stock is compounded with a heat curing agent.

7. A process as in claim 6 wherein the heat curing agent is a sulfur type curing agent.

8. A process as in claim 7 further comprising the step of preheating the extruded rubber strip prior to pressing it into the mold.

9. A process as in claim 1 further comprising the step of preheating the extruded rubber strip prior to pressing it into the mold.

10. A process as in claim 8 wherein the preheating step is performed by a microwave oven.

11. A process as in claim 1 wherein the preheating step is performed by a microwave oven.

* * * * *